United States Patent
Hornzee-Jones

[11] Patent Number: 5,273,303
[45] Date of Patent: Dec. 28, 1993

[54] W-SHAPED COMPOSITE BICYCLE FRAME

[75] Inventor: Christopher G. Hornzee-Jones, London, England

[73] Assignee: Structural Polymer (Holdings) Ltd., Cowes, England

[21] Appl. No.: 946,855

[22] Filed: Oct. 15, 1992

[51] Int. Cl.$^5$ .................. B62K 19/00; B62K 19/02
[52] U.S. Cl. .................. 280/288.3; 280/274; 280/281.1; D12/111
[58] Field of Search .................. 280/288.3, 274, 281.1, 280/275, 283; D12/111, 110

[56] References Cited

U.S. PATENT DOCUMENTS

| | | | |
|---|---|---|---|
| D. 235,249 | 6/1975 | Kitsuda | D12/111 |
| 2,773,695 | 12/1956 | Holloway | D12/111 |
| 3,329,444 | 7/1967 | Lidov | D12/111 |
| 4,230,332 | 10/1980 | Porsche | 280/288.3 |
| 4,856,801 | 8/1989 | Hollingsworth | 280/284 |
| 5,054,802 | 10/1991 | Smith | 280/288.3 |
| 5,188,384 | 2/1993 | van Raemdonck | 280/281.1 |

FOREIGN PATENT DOCUMENTS

| | | | |
|---|---|---|---|
| 844414 | 7/1952 | Fed. Rep. of Germany | 280/288.3 |
| 950622 | 10/1956 | Fed. Rep. of Germany | 280/288.3 |
| 779061 | 3/1935 | France | 280/288.3 |
| 1037830 | 9/1953 | France | 280/288.3 |
| 788950 | 1/1958 | United Kingdom | 280/288.3 |

Primary Examiner—Margaret A. Focarino
Assistant Examiner—Kevin Hurley
Attorney, Agent, or Firm—Jack C. Munro

[57] ABSTRACT

A bicycle frame constructed of a composite material and formed of an integral, one-piece unit having a W-SHAPED geometry when viewed from each side thereof.

7 Claims, 2 Drawing Sheets

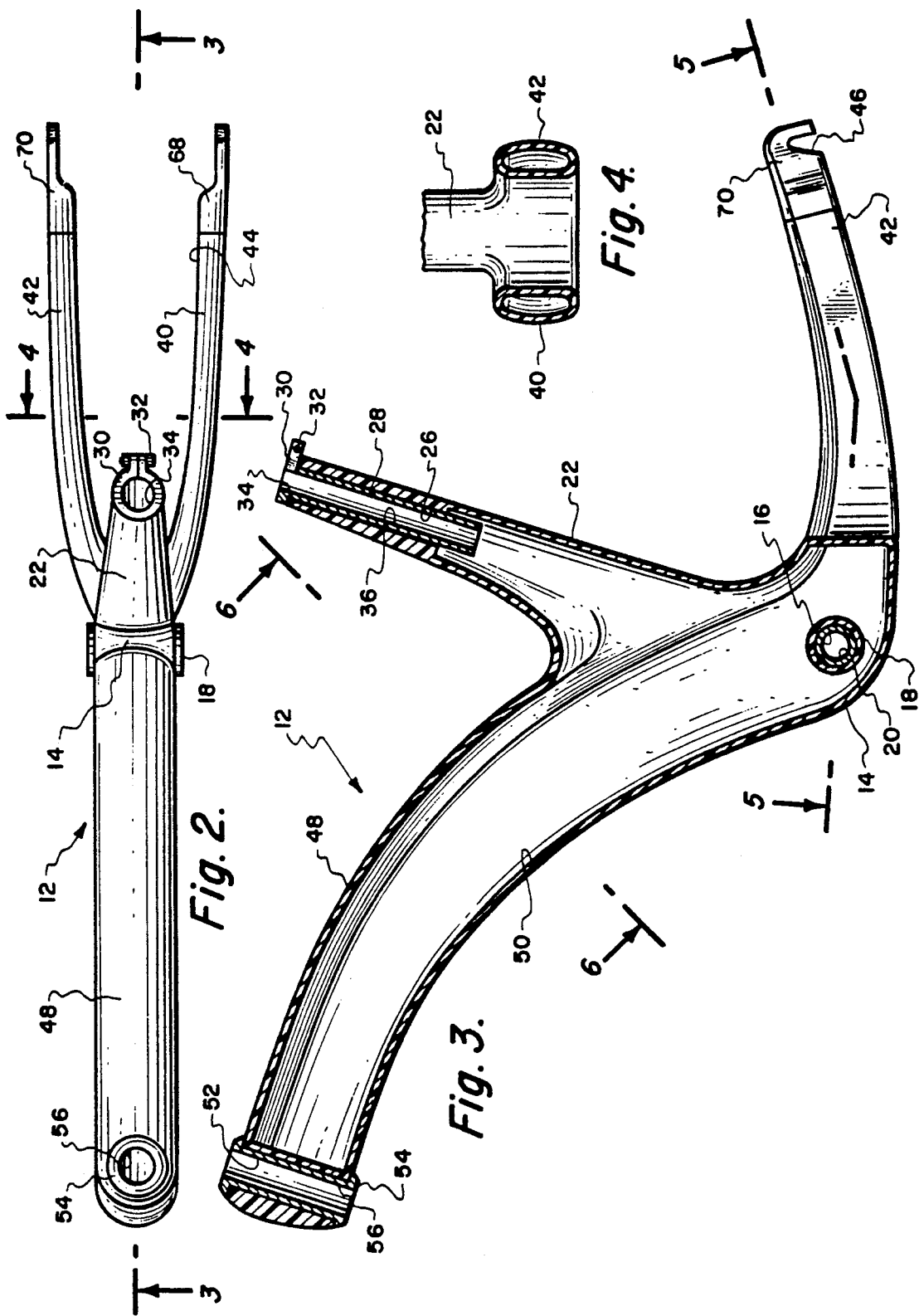

W-SHAPED COMPOSITE BICYCLE FRAME

BACKGROUND OF INVENTION

1) Field of the Invention

The field of this invention relates to construction of manually operated vehicles and more particularly to the construction of a bicycle frame which is strong and light in weight.

2) Description of Prior Art

Historically bicycle frames have been constructed of an assemblege of metal tubes. Every bicycle has a front wheel and a rear wheel. Supporting the rear wheel are a pair of what has been called chain stays which extend from a bracket which is used to rotationally support the pedal assembly. From this bracket there is connected a down tube which at its outer end is fixedly secured to a the steering tube which directly connects to a fork which supports the front wheel. From the bracket there also extends substantially vertically a seat tube, the upper end of which has mounted thereon a seat. From the upper end of the seat tube there is a top tube which connects to the steering tube and seat stays which connect to the outer ends of the chain stays. The typical frame of a bicycle thereby is composed of five separate tubular members excluding the steering tube.

Bicycles are used extensively in racing. Also bicycles are commonly used by the public both off-road and on-road. It has always been a particular advantage to construct the bicycle to be as light in weight as possible while maintaining sufficient strength to remain intact and not fail during extended usage of the bicycle over a period of years. The operation of any bicycle inherently receives a series of repetitive shocks. The bicycle frame has to be constructed to not fail from the onslaught of such shocks.

Previously, in order to have the bicycle frame to be of sufficient strength, the bicycle frame was constructed of metal. To make the bicycle frame lighter, the metal was formed into tubes and as previously mentioned there are five such tubes arranged which generally comprise the bicycle frame. In the past it was common to construct such bicycle frames of steel. Although steel frames are definitely of sufficient strength, the steel frame has a weight that is greater than desired.

In order to overcome the inherent disadvantage of steel bicycle frames, there has been developed numerous alloys of metal from which bicycle frames have been constructed. It is been common to construct bicycle frames of titanium alloys with titanium being a strong metal but light in weight. The main disadvantage to the use of titanium is that it is expensive.

It has been found that high strength bicycle frames can be obtained using composite structures which are constructed of carbon, boron, aramid and other synthetic non-metallic fibers bound together with a synthetic liquid resin such as epoxy. A bicycle frame can be made of such materials with a wall thickness which is quite thin and which produces a high strength bicycle frame which is low in weight. With the weight of the bicycle frame being substantially reduced, the overall weight of the bicycle is reduced, which not only enhances competitiveness in operation of the bicycle in racing, it also makes for easier operation for the normal user both on-road and off-road.

Making of bicycle frames out of composite materials in the pas has generally worked with the basic design shape of the bicycle frame, that is the aforementioned five tube arrangement. Composite bicycle frames have been defined in U.S. Pat. No. 4,900,048 inventor Gleb Derujinsky; U.S. Pat. No. 4,657,795, inventor Regis Foret; and U.S. Pat. No. 5,019,312, inventor Stephen J. Bishop wherein the construction of composite bicycle frames is clearly shown utilizing this basic shape of bicycle frame.

However, a variance in the basic shape of a bicycle frame constructed of composite materials is shown and taught within U.S Pat. No. 4,923,203, inventor Brent J. Trimble et al. The shape of the bicycle frame of Trimble et al. is that of an x-shape when viewed from the side. The advantage of this x-shape is that the down tube and the top tube have been combined into one main forward member. Also, the chain stays and the seat stay are in essence combined into one rearward member. The eliminating of members inherently lightens the weight of the bicycle frame which is a most desirable feature. However, the present inventor has found that this x-shape configuration can be significantly improved upon not only acheiving the desired lightening of the construction but also producing increased shock absorbing capabilities within the bicycle frame that are not attained within the x-shape frame of Trimble et al.

SUMMARY OF THE INVENTION

The bicycle frame of the present invention is designed to be constructed in the form of a hollow shell utilizing layers of composite fibers which are impregnated with a hardenable liquid synthetic resin. The composite bicycle frame is formed around a mold achieving its unique shape. The bicycle frame of the present invention is constructed of only three members which are integrally connected together into a one-piece constructual unit. The bicycle frame includes a bracket within which is mounted a conventional pedal assembly. From the bracket area of the frame is a rear unit extending rearwardly which is to support the rear wheel of the bicycle. This rear unit is formed of two separate members that are arranged in a bifurcated manner. This rear unit has a slightly concave configuration when viewed from above. This particular configuration supports the rear wheel in a cantilevered manner which functions as a shock absorber to help absorb shock and vibration during operation of the bicycle thereby minimizing the transfer of shock and vibration to the bicycle rider. From the bracket extending almost vertically and in an upward direction is a seat tube with the seat of the bicycle to be mounted at the upper or outer end of the seat tube. Also extending from the bracket is a forward member, the outer end of which connects to the front wheel support and steering assembly for the bicycle. This forward member is of a convex configuration when viewed from above or relative to the seat tube. This convex configuration is arcuate as shown in the drawings or could be a series of straight sections connected together to achieve the convex configuration. It has been found that the thickness of the shell of the bicycle frame can be constructed to be any desired thickness. However, in most bicycle frames of this invention, a thickness of about 0.070 inches has been found to be sufficient to achieve the desired strength. The actual weight of the bicycle frame will be approximately three pounds.

The primary object of the present invention is to construct a bicycle frame which is exceedingly low in weight yet high in strength and is capable of withstanding a continuous amount of abuse over a period of years without incurring any failure.

Another objective of the present invention is to construct a bicycle frame which functions as a shock absorbing unit to diminish the amount of shock and vibration that is transmitted to the bicycle rider.

Another objective of the present invention is to construct a bicycle frame which has a low center of gravity which thereby increases the overall stability of the bicycle while it is being operated.

Another objective of the present invention is to construct a bicycle frame which has an internal hollow shell which permits internal routing of gear and brake cables thereby eliminating their need to be located exteriorly of the bicycle frame.

Another objective of the present invention is to construct a bicycle frame which permits internal storage of drinking water, tools and possibly even a tire pump within the internal cavities of the bicycle frame again eliminating the need of external storage of such items.

Another objective of the present invention is to construct the bicycle frame which facilitates portage by the bicycle rider when the bicycle cannot be operated. The frame of this invention eliminates the top tube of the normal bicycle frame which interferes with this portage.

Another objective of the present invention is to construct the bicycle frame which permits the rear brake mechanisms to be mounted on the rear wheel support member near their roots providing a more rigid support of such brake mechanisms than was previously attained by bicycle frames of the prior art.

BRIEF DESCRIPTION OF THE DRAWINGS

FIG. 2 is a top, plan view of the bicycle frame of the present invention taken along line 2—2 of FIG. 1;

FIG. 3 is a side, cross-sectional view through the bicycle frame of the present invention taken along line 3—3 of FIG. 2;

FIG. 4 is a transverse, cross-sectional view through the rear unit of the bicycle frame of the present invention taken along line 4—4 of FIG. 2;

DETAILED DESCRIPTION OF THE SHOWN EMBODIMENT

Figure 1:
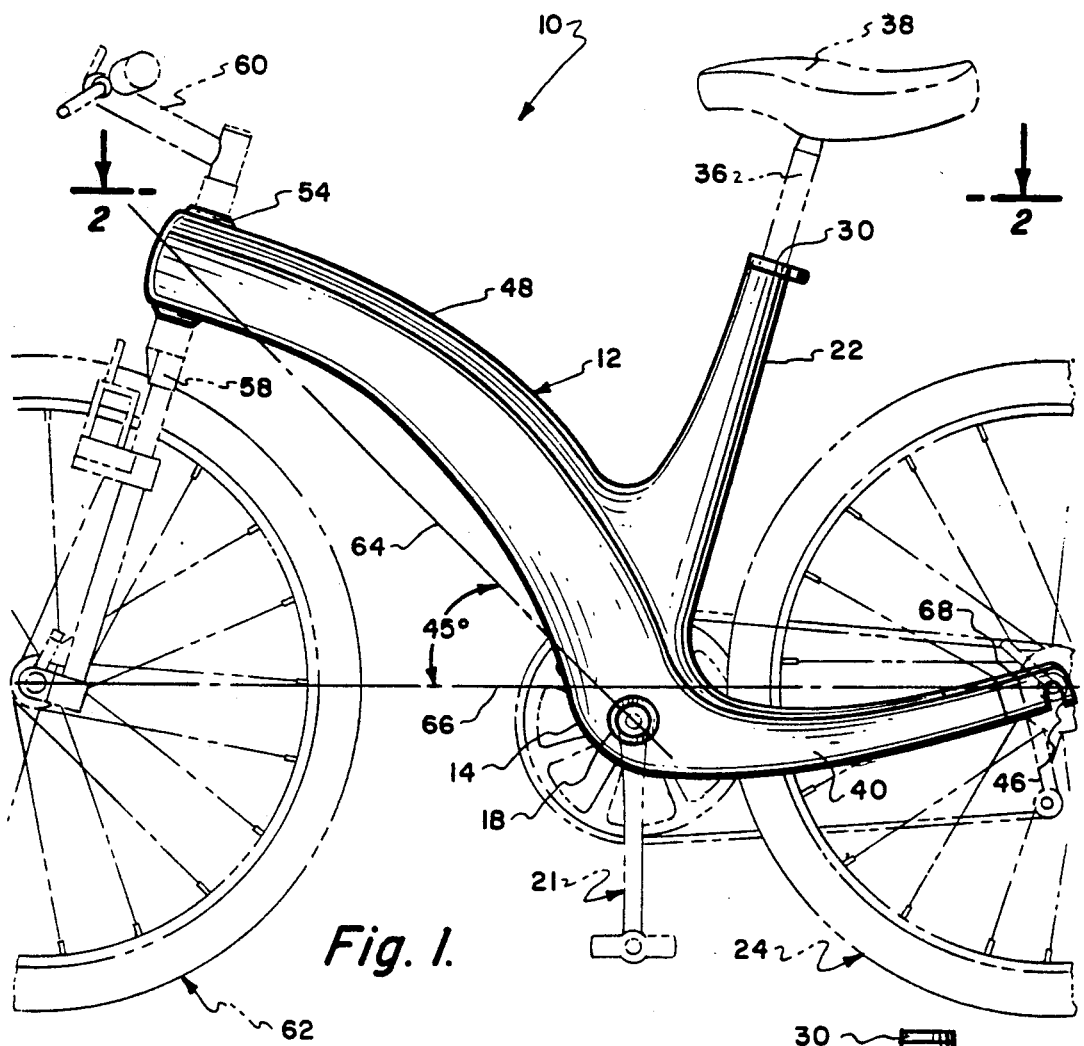
FIG. 1 is a side, elevational view showing the bicycle frame of the present invention mounted in conjunction with a conventional bicycle componentry.

Referring particularly to the drawings there is shown in FIG. 1 a bicycle 10 within which is incorporated the bicycle frame 12 of the present invention. The bicycle frame 12 is primarily constructed as a one-piece, integral, composite hollow shell of layers of fibers (such as carbon fibers) which have been impregnated with a liquid resin which has then been permitted to harden about a mold (herein not shown). The bicycle frame 12 includes a bracket area 14 within which there is formed a transverse through opening 16. Fixedly secured within the through opening 16 is a metallic sleeve 18. Mounted within the interior open-ended opening 20 of the metallic sleeve 18 is a conventional bicycle pedal assembly 21.

The bicycle frame 12 includes a seat tube 22. Seat tube 22 has a longitudinal dimension which is basically vertical but is slanted slightly in the rearward direction, that is toward the rear wheel 24 of the bicycle. The upper end of the seat tube 22 includes a hole 26 within which is fixedly secured a sleeve 28. Associated with the upper or outer end of the sleeve 28 is a clamping band 30. Associated with the clamping band 30 is a bolt and nut fastener 32 which when tightened achieves a decrease in the size of the internal opening 34 of the clamping band 30. Internal opening 34 connects directly within internal opening 36 of the sleeve 28. To be fixedly mounted at a desired height location within the internal opening 26 and fixedly secured in place by the clamping band 30 is a seat post 36 on which is fixedly mounted a seat 38 upon which the bicycle rider (not shown) is to be seated.

Figure 5:
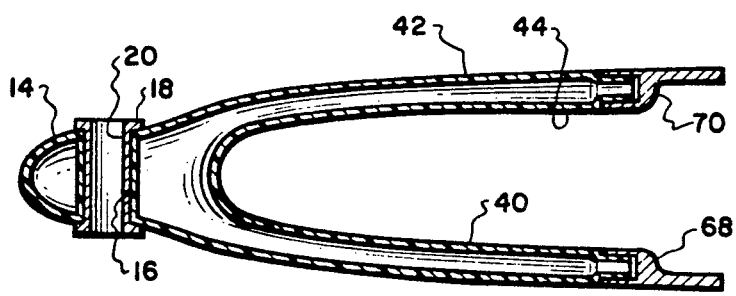
FIG. 5 is a longitudinal, cross-sectional view taken through the rear unit of the bicycle frame of the present invention taken along 5—5 of FIG. 3.
Figure 6:
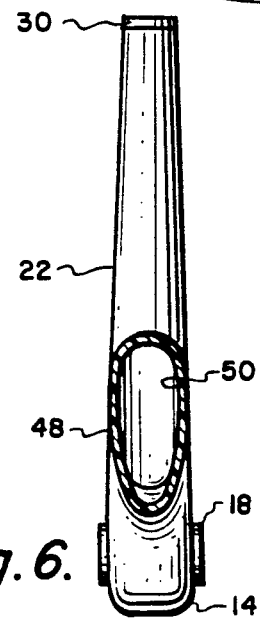
FIG. 6 is a transverse, cross-sectional view through the forward member of the bicycle frame of the present invention taken along line 6—6 of FIG. 3.

Extending rearwardly from the bracket 14 are a pair of members 40 and 42. The members 40 and 42 are basically identical but located in a mirror image, facing relationship. Members 42 and 44 are each tubular having a hollow interior. The cross-sectional area of each of the members 42 and 44 are substantially constant along their longitudinal length (see FIGS. 3, 4 and 5). Members 40 and 42 basically form a bifurcated unit forming a gap 44 there between. Within this gap 44 is located the rear wheel 24. The outer end of each of the members 42 and 44 includes a recess 46 which is to connect with the shaft of the rear wheel 24 defining the axis of rotation of such. Appropriate fasteners such as bolts will be utilized to securely mount the rear wheel 24 onto both of the members 40 and 42.

It is to be noted that the upper surface (that is the surface nearest the seat tube 22) of the members 40 and 42 are concave. Each of the members 40 and 42 support the rear wheel 24 in a cantilevered manner. Relative to the bracket 14 there is a certain amount of flexing permitted of the members 40 and 42 with this flexing being for the reason of diminishing the transmission of shock encountered by the rear wheel 24 as it is operated across the terrain upon which it is moved. Decreasing the amount of shock that is being transferred to the bracket 14 thereby decreases the amount of shock that is being transferred to the bicycle rider. In essence the fact that the upper edge of the members 40 and 42 is concave is to provide clearance for the bicycle brake assembly and aesthetics.

Also extending from the bracket 14 in a generally forward direction is a forward member 48 of the bicycle frame 12. The forward member 48 forms a enlarged hollow internal chamber 50 that can be utilized for the transmission of cables therein or possibly utilized for the storage of articles (not shown). The internal chamber 50 is of substantially constant cross-sectional area along the longitudinal direction of forward member 48 as is shown in FIG. 3. This forward member 48 is shown basically arcuate and assumes a basically convex configuration when viewed from above the bicycle frame 12 or convex relative to the seat tube 22. The outer end of the forward member includes a through opening 52. Fixedly mounted within the through opening 52 is a metallic sleeve 54. The sleeve 54 includes a through hole 56. Rotationally mounted within the hole 56 is the front wheel mounting fork 58. A handle bar 60 is mounted in conjunction with the fork 58 which is utilized to affect steering of the bicycle 10. The fork 58 is also utilized to support the front wheel 62.

Referring particularly to FIG. 1 there is shown a line 64 which is drawn between the center of through opening 20 and the longitudinal center point of the through opening 56. Another line 66 is drawn between the axis of rotation of wheels 24 and 62. The angular relationship between lines 64 and 66 is approximately forty five degrees. However, this angular relationship is certainly capable of being varied from the forty five degrees without departing from the scope of this invention. In referring to FIG. 1 it is to be readily observed that the forward member 48 is clearly depicted in an arcuate convex manner between the bracket 14 and the sleeve 54.

It is to be noted that the longitudinal axis of the through hole or the through opening 56 is slanted so is to be nonvertical so as to cause the front wheel 62 to be moved slightly forwardly of the bicycle frame 12. It is also to be noted that the longitudinal axis of the through opening 36 so as to displace the seat 38 slightly rearwardly and over a portion of the rear wheel 24. This positioning of the seat 38 and the front wheel 62 is deemed to be conventional and not a portion of the novelty of the present invention.

The outer end of the member 40 is secured through a metallic bracket 68. A similar metallic bracket 70 is secured to the outer end of the member 42. The securement between the bracket 68 and member 40 and bracket 70 and member 42 is accomplished by an adhesive. The recesses 46 are formed within the brackets 68 and 70. Reason for the need of the brackets 68 and 70 is that metal works better in conjunction with bolt fasteners to secure the rear wheel 24 in position within the rear unit composed of members 40 and 42.

What is claimed is:

1. A bicycle frame interconnecting a front wheel support and steering assembly, a seat support assembly, a pedal assembly and a rear wheel support assembly, said bicycle frame comprising:
    a generally hollow integral one-piece unit having a substantially W-shaped geometry when viewed from each side thereof, said W-shaped geometry defining a bifurcated rear unit to connect with said rear wheel support assembly and a forward member to connect with said front wheel support and steering assembly and further a seat support tube located intermediate said forward member and said bifurcated rear unit, said forward member having substantially the same cross-sectional area along its entire longitudinal length, relative to said seat support tube said forward member is basically convex in configuration.

2. The bicycle frame as defined in claim 1 wherein: said forward member being arcuate.

3. The bicycle frame as defined in claim 2 wherein: said rear unit being constructed of a pair of tubes, each of said tubes having substantially the same cross-sectional area along their entire longitudinal length, said bifurcated rear wheel support assembly assumes a concave configuration relative to said seat tube, relative to said seat support tube said bifurcated rear unit is concave in configuration.

4. The bicycle frame as defined in claim 3 wherein: said bicycle frame being constructed of layers of fibers impregnated with a synthetic liquid resin.

5. In combination with a bicycle, said bicycle having a front wheel and a front wheel steering assembly, said bicycle having a rear wheel, said bicycle having a pedal assembly and a seat, a bicycle frame comprising:
    said bicycle frame comprising a generally hollow integral one-piece unit, both said front wheel and said rear wheel each having an axis of rotation, said bicycle frame including a bifurcated rear wheel support assembly which extends longitudinally a direction substantially parallel to a line interconnecting said axes of rotation, said bifurcated rear wheel support assembly connects only to a bracket which is to support said pedal assembly;
    a seat tube extending only from said bracket in a longitudinal direction approaching perpendicular from said line interconnecting said axes of rotation, said seat tube to support said seat; and
    a forward member being connected only to said bracket and extending from said bracket in a generally longitudinal direction which is approximately forty-five degrees displaced from said line interconnecting said axes of rotation, said forward member having substantially the same cross-sectional area along its entire longitudinal length, said forward member having a basically convex configuration relative to said seat tube, said forward member to support said front wheel and said front wheel steering assembly, the angular displacement between said seat tube and said forward member being acute, the angular displacement between said seat tube and said bifurcated rear wheel support assembly also being acute.

6. The combination defined in claim 5 wherein: said rear unit being constructed of a pair of tubes, each of said tubes being substantially the same cross-sectional area along their entire longitudinal length, said bifurcated rear wheel support assembly assumes a concave configuration relative to said seat tube.

7. The combination defined in claim 6 wherein: said bicycle frame being constructed substantially entirely of layers of fibers impregnated with a hardenable synthetic liquid resin.

* * * * *